United States Patent [19]
Abe

[11] Patent Number: 5,376,984
[45] Date of Patent: Dec. 27, 1994

[54] REAL IMAGE TYPE FINDER

[75] Inventor: Tetsuya Abe, Tokyo, Japan

[73] Assignee: Asahi Kogaku Kogyo Kabushiki Kaisha, Tokyo, Japan

[21] Appl. No.: 962,002

[22] Filed: Oct. 15, 1992

Related U.S. Application Data

[63] Continuation of Ser. No. 655,080, Feb. 14, 1991, abandoned.

[30] Foreign Application Priority Data

Feb. 14, 1990 [JP] Japan ................................. 2-33011

[51] Int. Cl.$^5$ ............................................ G03B 13/02
[52] U.S. Cl. .................................... 354/219; 359/432; 359/740
[58] Field of Search ............... 354/219, 220-225, 354/199, 200, 201; 359/400, 423, 422, 432, 434, 683, 740

[56] References Cited

U.S. PATENT DOCUMENTS

| | | | |
|---|---|---|---|
| 3,433,559 | 3/1969 | Vockenhyber et al. | 359/432 |
| 3,918,797 | 11/1975 | Takano | 359/683 |
| 4,027,327 | 5/1977 | Harada | 354/201 |
| 4,270,837 | 6/1981 | Baker | 359/402 |
| 4,339,188 | 7/1982 | Smith | 354/219 |
| 4,526,444 | 7/1985 | Fantone et al. | 359/362 |
| 4,751,539 | 6/1988 | Yamada et al. | 354/222 |
| 4,775,229 | 10/1988 | Ichihara et al. | 359/742 |
| 4,909,614 | 3/1990 | Itoh et al. | 359/683 |
| 4,941,012 | 7/1990 | Inabata | 354/478 |
| 4,967,219 | 10/1990 | Morisawa et al. | 354/199 |
| 4,992,809 | 2/1991 | Nozaki et al. | 354/149.11 |
| 5,086,353 | 2/1992 | Mukai et al. | 359/432 |

FOREIGN PATENT DOCUMENTS

| | | |
|---|---|---|
| 2408871 | 8/1974 | Germany . |
| 3904640 | 8/1989 | Germany . |
| 61-156019 | 7/1986 | Japan . |
| 1257817 | 10/1989 | Japan . |
| 690309 | 4/1953 | United Kingdom . |
| 1295214 | 11/1972 | United Kingdom . |
| 2076987 | 12/1981 | United Kingdom . |

OTHER PUBLICATIONS

Camera Viewfinder Using Titled Concave Mirror Erecting Elements, D. DeJager, SPIE vol. 237, 1980, International Lens Design Conference (OSA), pp. 292-298.

English Translation of Japanese Patent Publication 61-156019.

S. Flugge, "Handbunch der Physik", vol. XXIX, 1967, pp. 230-232 and 285-289, with English translation.

English language abstract of Japanese Patent Publication JP-1129225.

Primary Examiner—Howard B. Blankenship
Attorney, Agent, or Firm—Sandler Greenblum & Bernstein

[57] ABSTRACT

A real image type finder is provided comprising an objective optical system, an eye piece optical system, and an aperture which is arranged in the objective optical system and that is substantially conjugate with an exit pupil. The finder permits a user to adjust the aperture diameter and its position simply by manipulating the aperture for adjustment.

26 Claims, 4 Drawing Sheets

REAL IMAGE TYPE FINDER

This application is a continuation, of application number 07/655,080, filed Feb. 14, 1991, now abandoned.

BACKGROUND OF THE INVENTION

1. Field of the Invention

The present invention relates mainly to a real image type finder for use in cameras.

2. Description of Related Art

Among cameras having a finder optical system provided on the camera body separately from an imaging optical system, a finder such as the Galilean finder has found widespread popularity in various fields of application hereinbefore. However, with the improved imaging systems being put on the market, the market preference trend has been switched to real image type finders which can form an image of an object with a relatively high magnification power and a bright frame of the view field. Additionally, with the market trend moving toward more compact cameras, a need has arisen for an image type finder which may form an image with high magnification power and a reduced overall length.

However, the prior art camera finder suffered from the disadvantage that the finder frequently caused a flare around an eye point with the increase of the magnification power in each of the lenses which constitute the optical system; this resulted in the image being quickly impaired by the presence of such flares etc., when a viewer's pupil moved while looking in through the finder.

Recently, a zoom lens with a highly variable magnification power has become a popular item for use in the imaging system, and it has also generated demand for real image finder with a highly variable magnification power ratio and high magnification power.

However, in a prior art zoom finder, the eye point diameter is subject to substantial variation due to its variable power. That is, the eye point diameter is subject to excessive increase at the end of the wide-angle position, and thereby causes a substantial flare to be created around the eye point.

There was also a problem with the eye point diameter being reduced excessively at the end of the telephoto position; this kept the viewer from seeing the object, when the user manipulate the camera to reduce the eye point diameter at the end of the wide-angle position in order to solve the problem.

When the aperture is apart from the object optical system, quality of image-forming in the object optical system deteriorates, and diameter of the front lens of the object optical system has to be increased, since light at the periphery of the field-of-view passes through the periphery of the object optical system.

SUMMARY OF THE INVENTION

It is therefore an object of the present invention to provide a real image type finder wherein the chance of the flare etc., occurring around the exit pupil (eye point) is eliminated; this is done by allowing the exit pupil of proper diameter to be formed at a suitable rearward location of the eye piece optical system, thereby reducing the possibility of the exit pupil diameter's being decreased even in the case of the zoom finder having a highly variable magnification power ratio.

One feature of the present invention is that it provides a real image type finder which includes an objective optical system, an eye piece optical system, and an aperture which is arranged in the objective optical system, and that is substantially conjugate with the exit pupil.

This arrangement may permit a user to adjust the aperture diameter and its position simply by manipulating the aperture for adjustment.

Moreover, in a preferred embodiment, it is a feature of the finder in accordance with the present invention that a zoom finder is provided which has an objective lens system including two sets of variable magnification power lenses, each of which is movable toward and away from each other, wherein an aperture is integrally and moveably provided in a rearward variable magnification power lens group.

This arrangement serves to reduce variation in the exit pupil diameter despite the zooming operation due to a reduced distance along which the rear variable magnification power lens groups may be movable during the zooming operation.

The present disclosure relates to subject matter contained in Japanese Utility Model Application No. 02-33011 (filed on Feb. 14, 1990) which is expressly incorporated herein by reference in its entirety.

BRIEF DESCRIPTION OF THE DRAWINGS

The invention will be described below in detail with reference to the accompanying drawings, in which.

FIGS, 1A and 1B show an optical path in an embodiment of the present invention as applied in a zoom finder optical system, wherein.

DESCRIPTION OF PREFERRED EMBODIMENTS

The present invention will be described hereinbelow, with reference to the accompanying drawings. This example represents an embodiment of the present invention as applied in a camera finder.

Figure 3:
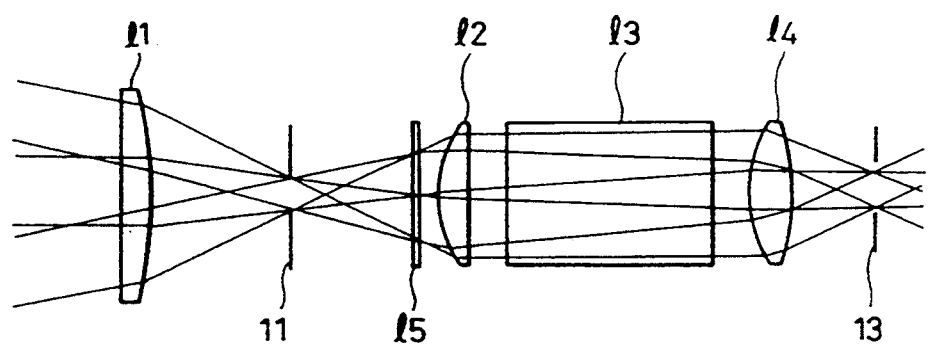
FIG. 3 is a view showing one embodiment of the optical path as applied in a real image finder of the present invention.

FIG. 3 is a view of one embodiment of the real image type finder optical system showing how its lens system is constituted. The real image type finder of the invention comprises an objective lens optical system 1 1, a condenser lens 1 2, an erect image optical system 1 3, and an eye piece 1 4, arranged respectively from the objective side. The erect image optical system 1 3 and the eye piece 1 4 are used to constitute the eye piece optical system.

The condenser lens 1 2 is arranged in the vicinity of the imaging surface of the objective optical system 1 1 so as to form an eye point at a proper position rearwardly of the eye piece 1 4 by adjusting the divergence of the light beam which passes through the optical system 1 3.

A field view frame glass 1 5 is arranged on or in the vicinity of the imaging surface of the objective optical system 1 1. As known in the art, a field view frame and a direction finding etc., (not shown) are mapped over the field view frame glass 1 5.

Furthermore, an aperture 11 is formed between the optical objective lens 1 1 and the condenser lens 1 2. The aperture 11 is substantially circular in shape, and an exit pupil (eye point) 13 by this aperture 11 is formed rearwardly of the eye piece 1 4.

As described above, in the real image type finder in accordance with one embodiment of the invention, the aperture 11 is present in the objective optical system, thereby realizing the objective optical system in a compact configuration, and furthermore allowing the viewer to have a satisfactory quality image.

In the above optical system, it is preferable to arrange the aperture 11 so that it is spaced apart from the condenser lens 1 2 by a distance d which may be established from the following conditions:

$$f_c \cdot 0.5 < d < f_c \cdot 2.0 \qquad 1$$

($f_c$; a focal point distance of the condenser lens).

In accordance with the above formula 1, there is established a conjugate relationship between the aperture 11 and the eye point 13, since the condenser lens 1 2 and the eye piece 1 4 are approximate to the telecentric optical system, respectively, in an opposed relationship with the erect image optical system 1 3 interposed to act as a boundary. Thus, the diameter of the exit pupil may be easily adjusted by varying the diameter of the aperture 11. In the meantime, the main beams which have passed through the condenser lens 1 2 are parallel to each other with the relation of $d = f_c$, resulting in that the aperture 11 and the condenser lens 1 2 cooperate with each other to form the telecentric optical system.

The condenser lens 1 2 need not essentially be a lens, but can be any optical system which can provide performance characteristics equivalent with that of a condenser. For example, where a prism is utilized in the optical system 1 3, the incident surface of the prism may be formed with a predetermined curvature to allow for the prism to provide performance characteristics of a condenser which is equivalent to those of the condenser lens. In such a case, the parameter $f_c$ is set as an inverse of the refracting power on the incidence of the prism.

In the meantime, the erect image optical system 1 3 may use not only a prism, but also a relay lens, etc.

The embodiment of the invention has been described, wherein the invention is applied in a finder optical system with a fixed magnification power; a further embodiment of the invention will be described hereinbelow, with reference to FIGS. 1A, 1B, 1C, and FIG. 2, wherein the invention is illustrated as applied in a zoom finder optical system.

The zoom finder optical system comprises a first positive lens group L1, a second negative lens group L2, a third positive lens group L3, a lens prism P1, a compound lens prism P2, and a fourth positive lens group (eye piece) L4 which are arranged respectively from the object side. Lens groups L1–L3 and the lens prism P1 form the objective lens optical system, whereas the compound lens prism P2 and the eye piece L4 constitute the eye lens optical system.

In the meantime, the lens prism P1 also constitutes the fourth lens group in the objective optical system.

The first lens group L1 and the eye piece L4 are fixed type lenses, whereas the second and the third lens groups L2 and L3 are movable lens groups with a variable magnification power (variable magnification power lens group). The lens prism P1 and the compound lens prism P2 form an erecting optical system.

The second and the third lens groups L2 and L3 have their view field varied in a normal zooming range intermediate between the wide-angle and the telescoped positions, while moving toward and away from each other in unison with the zooming operation of the optical system, thereby varying its view field (magnification power).

The incident surface and the exit surface of the lens prism P1 are formed in the configurations of a concave and convex-shaped lens, and the compound prism P2 is formed with a incident surface C1 in the configuration of a convex-shaped lens.

A view field frame glass L5 is arranged in the vicinity of the surface where an image is formed by the lens groups L1, L2, and L3, along with the lens prism P1. A view field frame is mapped on this view field frame glass L5. An image which is formed by the first, the second and the third lens groups L1, L2, and L3 and the lens prism P1 is focused on this view field frame glass L5 (or a forward or rearward portion adjacent to the frame). This image is formed by the optical system in combination with the lens prism P1 and the compound lens prism P2, and may be observed as a real image through the eye piece L4.

In the optical system of the real image type finder constructed as above, an aperture 15 is arranged on the rear surface of the third lens group L3 to be movable integrally with the lens group L3. The aperture 15 is substantially circular in shape (see FIG. 2).

Figure 1A:
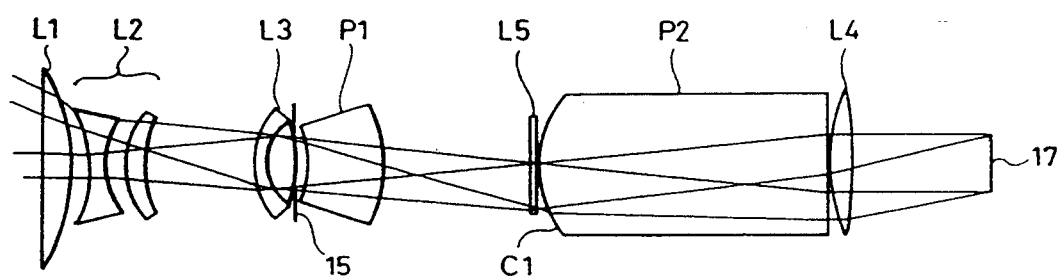
FIGS. 1A and 1B show the "wide-angle" and "telescoped" positions of the path respectively.
Figure 1B:
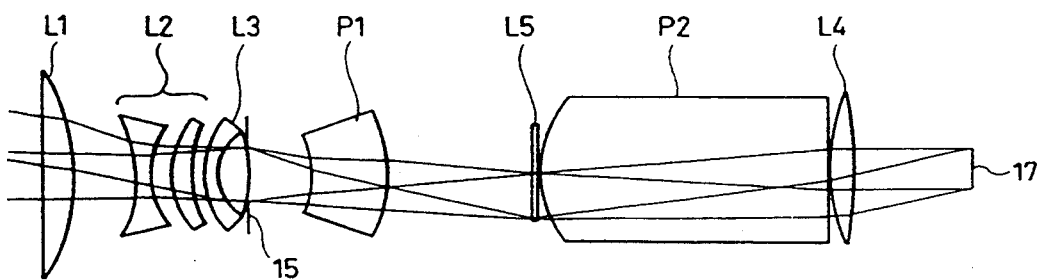

FIG. 1A and FIG. 1B show the variation of the image of the aperture 15 in accordance with the variation in the magnification power of the optical system of the above real image type finder; that is, they illustrate how the exit pupil 17 varies. As can be seen from these drawings, as the moving amount of the third group L3 is small, the exit pupil 17 is subject to less positional and diametrical variation at the wide-angle position (as shown in FIG. 1A) and the telescoped end position (as shown in FIG. 1B). Thus, the eye point diameter can be easily adjusted by adjusting the diameter of the aperture 15, thereby minimizing the chance of a flare and/or the like to be created around the eye point. As pointed out above, the real image type zoom finder of the present invention permits users to have a finder image which is constantly satisfactory in quality irrespective of the magnification power of the finder. Furthermore, the image is not impaired even when the user moves his pupil slightly.

Figure 1C:
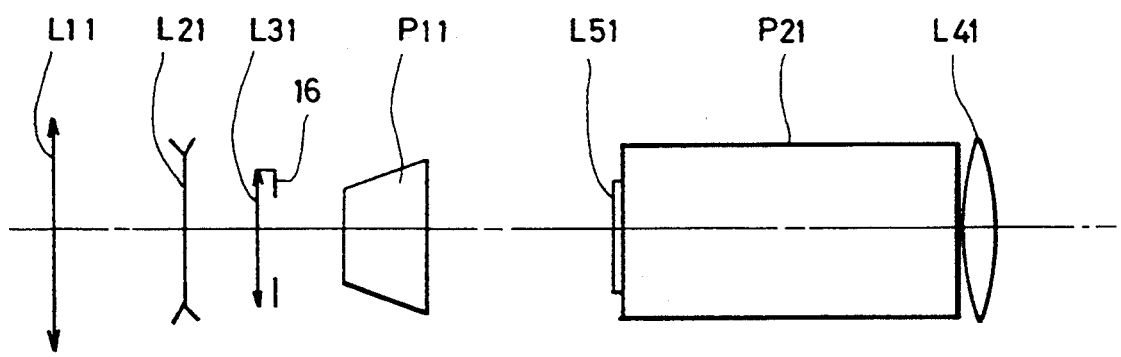
FIG. 1C shows another embodiment of the present invention; as applied in a zoom finder optical system.
Figure 2:
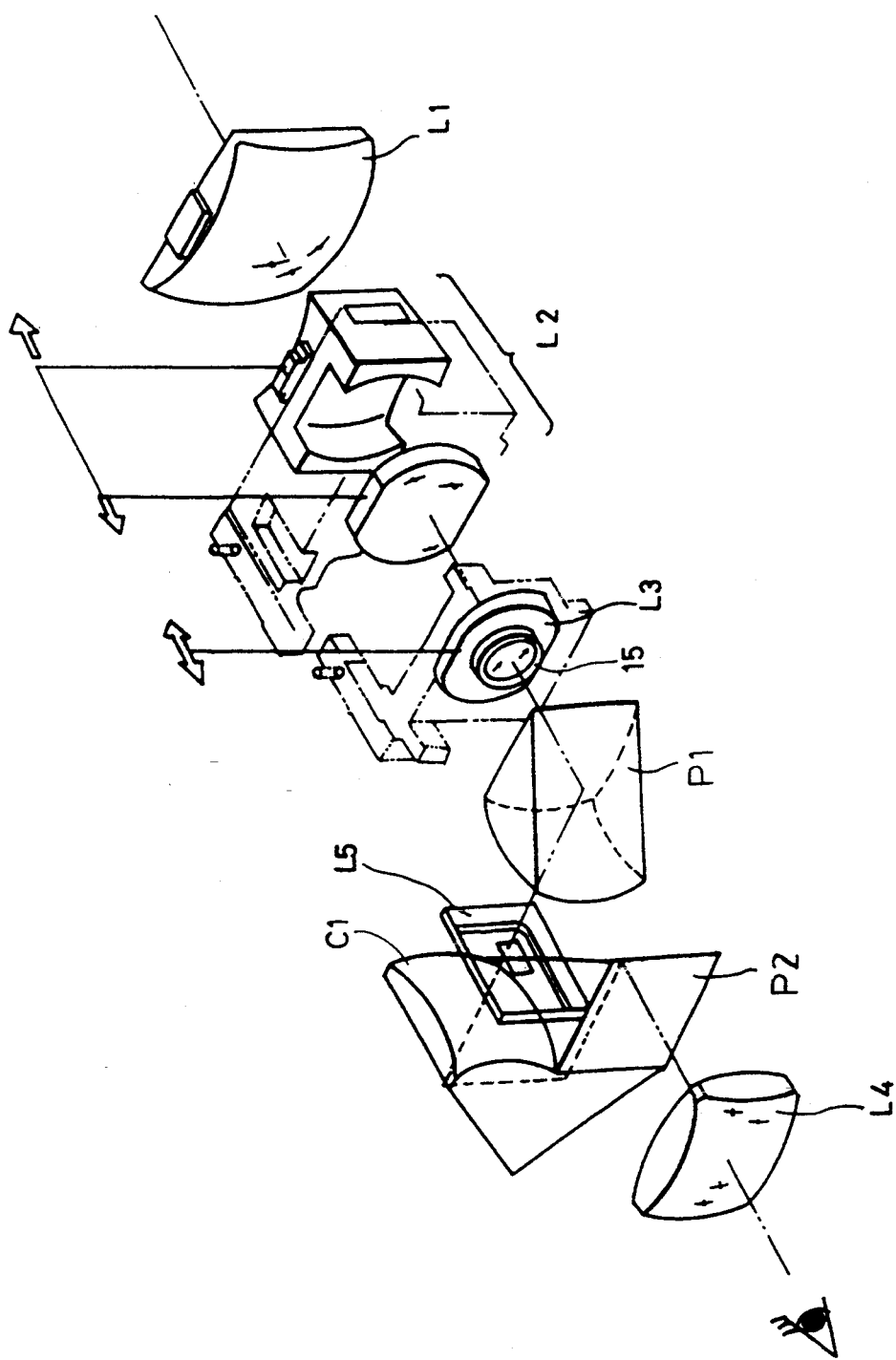
FIG. 2 is a perspective view in explosion, showing the zoom finder of a zoom finder optical system.

FIG. 1C shows another embodiment of the present invention, which is a modification of the embodiments of FIGS. 1A and 1B.

In this embodiment, the objective optical system comprises a first positive lens group L11, a second negative lens group L21, and a third positive lens group L31. Zooming is conducted by the relative movement of the second lens groups L21 and the third lens group L31 in the direction of optical axis. The aperture 16 is secured on the lens group L31. P11 and P21 indicate a prism comprising the erect optical system. L51 indicates the frame of field-of-view, and the lens group L41 is an eye piece.

By disposing the aperture in the object optical system, the object optical system can be minimized in size because the reflective members are in general disposed in the rear portion of the object optical system, so that a fine quality of image-forming in the finder erecting optical system is obtained.

The present invention has been described hereinabove relative to the embodiment wherein the present invention is applied to a zoom lens consisting of four lens groups; the present invention may also be embodied in a zoom lens consisting of three or two lens groups (if its zooming ratio is reduced). The lens prism P1 and the compound prism P2 are used to form a real image optical system, but alternatively other known prisms and mirrors, or a combination of them may also be used. Moreover, the apertures 11, 15 and 16 may be used in configurations other than circular shapes.

Although the embodiment of the invention as applied in the real image type zoom finder has been described hereinabove with reference to the accompanying drawings, the scope of the present invention is not limited to embodiment as a camera finder, but may also be embodied as, for example, a telescope.

As described above, the present invention relates to a real image type finder which is adapted to convert an image to be formed by an objective optical system into an a focal system through an eye piece provided rearwardly of the objective lens, wherein an aperture is provided in the objective optical system to allow users to adjust the eye point diameter easily by adjusting the aperture diameter.

Moreover, since an aperture is provided which is movable integrally with the rear magnification varying lens group in the real image type zoom finder, a variation in the exit pupil diameter due to the zooming action may be reduced, thereby permitting the user to observe an object easily with any view field magnification.

I claim:

1. A real image type finder comprising:
   a zoom objective optical system having first, second, and third lens groups being arranged respectively from an object side, said first lens group having positive power, said second lens group having negative power, and said third lens group having positive power, said second and third lens groups being movable toward and away from each other to vary magnification power;
   an eye piece optical system including an eye piece; and
   an aperture arranged in said objective optical system on the eye piece side of said third lens group, said aperture being movable integrally with said third lens group.

2. A real image type finder according to claim 1, wherein said eye piece optical system further comprises an erect image optical system.

3. A real image type finder according to claim 2, wherein said erect image optical system is constituted by combining reflective members.

4. A real image type finder according to claim 3, wherein said aperture is located at a position closer to said objective optical system rather than to said reflective members.

5. A real image type finder according to claim 1, wherein said aperture is substantially circular in shape.

6. A real image type finder according to claim 3, wherein said reflective members comprise a lens prism and a compound lens prism arranged respectively from the object side.

7. A real image type finder according to claim 1, wherein said objective optical system and said eye piece optical system have positive refractive powers respectively.

8. A real image type finder according to claim 1, wherein said aperture is arranged on a surface of said third lens group.

9. A real image type finder according to claim 1, wherein said aperture is substantially circular in shape.

10. A real image type finder according to claim 1, further comprising a fourth lens group.

11. A real image type finder according to claim 10, wherein said aperture is substantially circular in shape.

12. A zoom finder optical system comprising:
    an objective lens optical system having first, second, and third lens groups being arranged respectively from an object side, said first lens group having positive power, said second lens group having negative power, and said third lens group having positive power, said second and third lens groups being movable toward and away from each other to vary magnification power;
    an eye piece optical system including an eye piece; and
    an aperture arranged in said objective lens optical system on the eye piece side of said third lens group, said aperture being movable integrally with said third lens group.

13. A zoom finder optical system according to claim 12, further comprising a lens prism, wherein said first lens group is fixed.

14. A zoom finder optical system according to claim 13, wherein said eye piece optical system comprises a compound lens prism and a fourth positive lens group.

15. A zoom finder optical system according to claim 14, wherein said fourth lens group comprises an eye piece and a lens prism, said eye piece being fixed.

16. A zoom finder optical system according to claim 14, wherein said compound lens prism comprises an incident surface in the configuration of a convex-shaped lens.

17. A zoom finder optical system according to claim 14, wherein said compound lens prism comprises an incident surface in the configuration of a concave-shaped lens and an exit surface in the configuration of a convex-shaped lens.

18. A zoom finder optical system according to claim 15, wherein said compound lens prism comprises an incident surface in the configuration of a concave-shaped lens and an exit surface in the configuration of a convex-shaped lens.

19. A zoom finder optical system according to claim 12, wherein said aperture is substantially circular in shape.

20. A zoom finder optical system according to claim 12, wherein a view field frame glass is arranged adjacent the surface where an image is formed by said objective lens optical system.

21. A real image type finder according to claim 1, wherein said real image type finder further comprises a condenser lens that is arranged adjacent an imaging surface of said objective optical system.

22. A real image type finder according to claim 1, wherein said real image type finder further comprises a field view frame glass that is arranged on or adjacent of an imaging surface of said objective optical system.

23. A real image type finder according to claim 1, wherein said eye piece optical system further comprises an exit pupil being located outside of said eye piece, at the eye point of a user.

24. A zoom finder optical system according to claim 12, wherein said eye piece optical system further comprises an exit pupil being located outside of said eye piece, at the eye point of a user.

26. A real image type finder according to claim 1, wherein said third lens group comprises a front surface and a rear surface, said rear surface being on the eyepiece side of said third lens group, and said aperture is mounted on said rear surface of said third lens group.

26. A real image type finder according to claim 12, wherein said third lens group comprises a front surface and a rear surface, said rear surface being on the eyepiece side of said third lens group, and said aperture is mounted on said rear surface of said third lens group.

* * * * *